United States Patent
Nilsson et al.

(10) Patent No.: US 9,744,850 B2
(45) Date of Patent: Aug. 29, 2017

(54) ELECTRIC DRIVE AXLE ARRANGEMENT FOR A ROAD VEHICLE

(71) Applicant: BorgWarner TorqTransfer Systems AB, Landskrona (SE)

(72) Inventors: Kristoffer Nilsson, Lund (SE); Gustaf Lagunoff, Malmo (SE); Staffan Nilsson, Helsingborg (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 262 days.

(21) Appl. No.: 14/383,378

(22) PCT Filed: Mar. 12, 2013

(86) PCT No.: PCT/EP2013/055032
§ 371 (c)(1),
(2) Date: Sep. 5, 2014

(87) PCT Pub. No.: WO2013/135720
PCT Pub. Date: Sep. 19, 2013

(65) Prior Publication Data
US 2015/0065283 A1 Mar. 5, 2015

(30) Foreign Application Priority Data
Mar. 15, 2012 (SE) ...................... 1250242

(51) Int. Cl.
*B60K 17/12* (2006.01)
*B60K 1/00* (2006.01)
*B60K 17/16* (2006.01)

(52) U.S. Cl.
CPC ............... *B60K 17/12* (2013.01); *B60K 1/00* (2013.01); *B60K 17/16* (2013.01);
(Continued)

(58) Field of Classification Search
CPC ..................................................... B60K 17/12
See application file for complete search history.

(56) References Cited

U.S. PATENT DOCUMENTS

| 6,393,667 B1* | 5/2002 | Slavik | B65H 54/80 19/150 |
| 2004/0005954 A1* | 1/2004 | Asa | B60H 1/004 477/7 |

(Continued)

FOREIGN PATENT DOCUMENTS

| CN | 101445040 A | 6/2009 |
| CN | 101480967 A | 7/2009 |

(Continued)

OTHER PUBLICATIONS

Yelne, A. and Heitner, K., "Switched Reluctance Drives for Electric and Hybrid Vehicles," 1996, SAE Technical Paper 960256.*

(Continued)

*Primary Examiner* — Huan Le
*Assistant Examiner* — Lori Wu
(74) *Attorney, Agent, or Firm* — BrooksGroup

(57) ABSTRACT

An electric drive axle arrangement for a road vehicle comprises an electric drive motor (1), a differential mechanism (3, 4) for allowing different velocities of drive wheels driven by the drive motor, and a torque vectoring system (2, 6, 7) for controlling the distribution of drive torque between the two drive wheels. A torque vectoring motor (2) of the torque vectoring system is of the non-permanent magnet motor type.

20 Claims, 1 Drawing Sheet

(52) U.S. Cl.
CPC ...... *B60K 2001/001* (2013.01); *F16H 2200/0021* (2013.01); *Y02T 10/7258* (2013.01)

(56) References Cited

U.S. PATENT DOCUMENTS

| | | | | |
|---|---|---|---|---|
| 2004/0108778 | A1* | 6/2004 | Tsukamoto | H02K 7/116 310/83 |
| 2007/0152529 | A1* | 7/2007 | Kamiya | B60L 9/18 310/166 |
| 2008/0066980 | A1* | 3/2008 | James | B60K 7/0007 180/65.51 |
| 2009/0033259 | A1* | 2/2009 | Cesario | G05B 13/04 318/400.04 |
| 2011/0260664 | A1* | 10/2011 | Kim | H02P 27/08 318/400.14 |
| 2011/0288738 | A1* | 11/2011 | Donnelly | F02D 19/0697 701/99 |
| 2014/0106930 | A1* | 4/2014 | Smetana | B60K 1/00 477/35 |

FOREIGN PATENT DOCUMENTS

| | | |
|---|---|---|
| CN | 201956949 U | 8/2011 |
| CN | 102291084 A | 12/2011 |
| CN | 102341622 A | 2/2012 |
| JP | H0715804 A | 1/1995 |
| JP | 2004187437 A | 7/2004 |
| JP | 2006204043 A | 8/2006 |
| JP | 2008099467 A | 4/2008 |
| JP | 2010064622 A | 3/2010 |
| JP | 2010144762 A | 7/2010 |
| JP | 2010167962 A | 8/2010 |
| JP | 2010268632 A | 11/2010 |
| JP | 2011050170 A | 3/2011 |
| WO | 2010101506 A1 | 9/2010 |
| WO | 2011076542 A1 | 6/2011 |
| WO | WO 2011065888 A1 * | 6/2011 ............... B60K 1/00 |
| WO | 2011142050 A1 | 11/2011 |
| WO | 2012066035 A1 | 5/2012 |

OTHER PUBLICATIONS

Yelne et al., Switched Reluctance Drives for Electric and Hybrid Vehicles, Feb. 26, 1996, SAE International, SAE 960256.*
Japanese Office Action dated Aug. 23, 2016; Application No. 2014-561424 ; 3 pages.
Chinese Office Action and Search Report dated Jun. 3, 2016, Application No. 201380013492.1; Applicant:BorgWarner TorqTransfer Systems AB; 10 pages.
Japanese Office Action dated Jun. 26, 2017, JP Application Serial No. 2014-561424, including translation of Notification of Reasons for Refusal, 6 pages total.

* cited by examiner

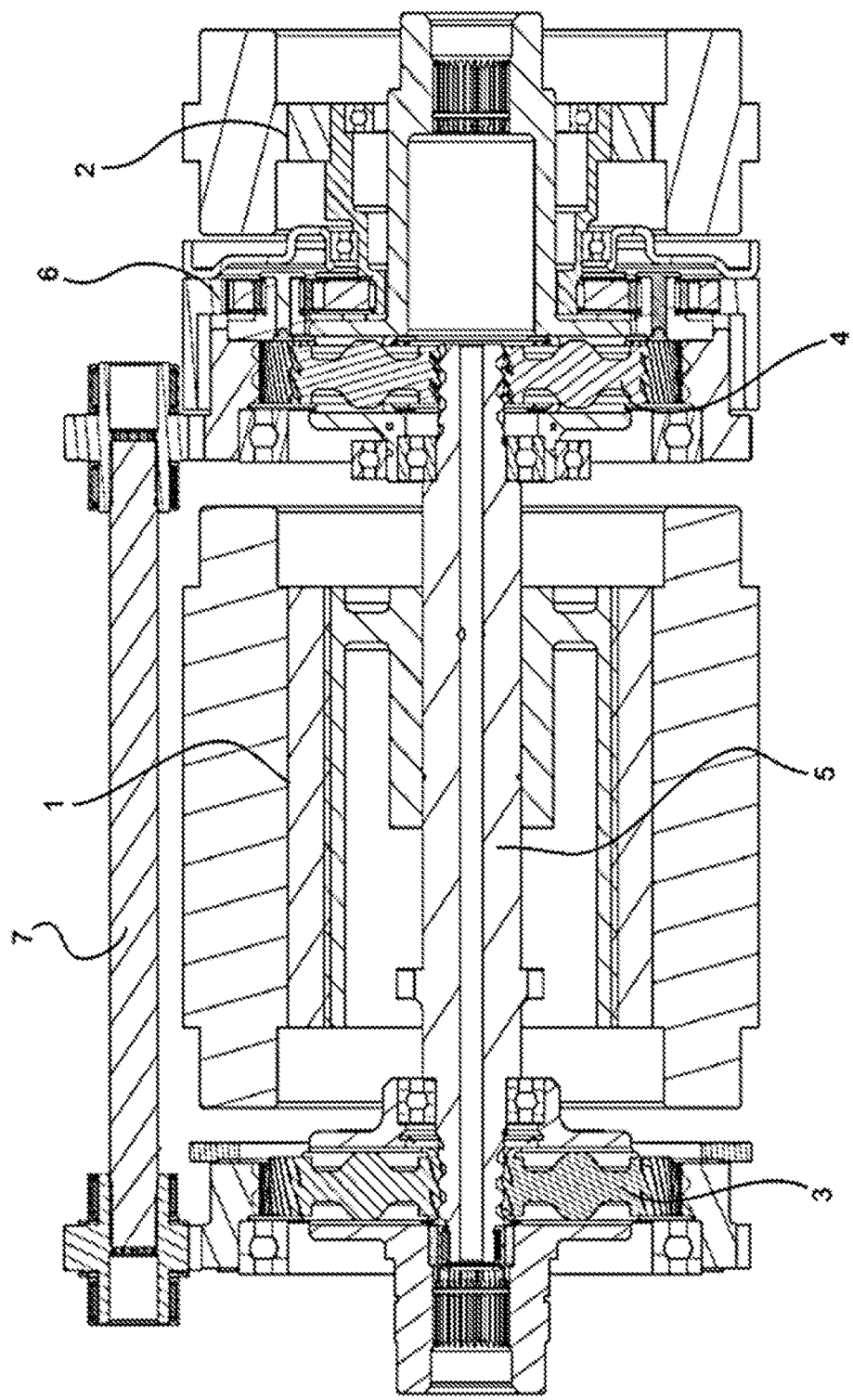

ELECTRIC DRIVE AXLE ARRANGEMENT FOR A ROAD VEHICLE

This application claims the benefit of Swedish Application No. 1250242-3 filed Mar. 15, 2012 and PCT Application No. EP2013/055032 filed Mar. 12, 2013.

TECHNICAL FIELD

The present invention relates to an electric drive axle arrangement for a road vehicle, comprising an electric drive motor, a differential mechanism for allowing different velocities of drive wheels driven by the drive motor, and a torque vectoring system for controlling the distribution of drive torque between the two drive wheels, the torque vectoring system comprising a torque vectoring motor.

BACKGROUND OF THE INVENTION

There is a current trend to develop hybrid cars, in which often the front axle is driven by an internal combustion engine and the rear axle is driven by an electric motor. Driving can occur by means of either axle or by a combination of the two. The electric motor is powered by batteries in the car, which may be charged by the internal combustion engine or otherwise.

The torque vectoring system of an electric drive axle arrangement as defined above has to fulfill very stringent requirements in many respects, not the least with regard to safety, as it may supply extra drive torque to drive wheels of the car. Any malfunction may lead to catastrophic results.

Thus, an important requirement is that a higher torque than asked for shall never be supplied by the torque vectoring system.

For different reasons, it is common today to use a Permanent Magnet Synchronous Motor (PMSM) as the torque vectoring motor in an electric drive axle arrangement. For obtaining a correct torque output from the PMSM motor it is imperative to know the position of the rotor in the motor. As this position determination is so critical, it is natural to introduce redundancy by duplicating the position determination means (resolver, contacts, cables, electronics), which makes the system more expensive and more difficult to pack into the arrangement, where space is extremely sparse.

Another drawback with the PMSM motor is that it supplies a torque in a shortcut condition, which otherwise often is defined as the safest condition to revert to for example at the possible loss of a resolver signal.

A torque vectoring system comprising a PMSM motor and a resolver accordingly provides a system solution that can cause dangerous driving situations even after a singular fault in the system.

The Invention

A better solution according to the invention is to make use of a non-permanent magnet motor as the torque vectoring motor.

It is especially suitable to use a Reluctance Motor, such as a Switched Reluctance Motor (SRM), as such a motor in principle can only supply a lower torque than asked for at a defect rotor position signal. At disruption of one or more phase conductors, total loss of the control electronics, or shortcut, an SRM motor will not supply any torque at all, which is of great advantage for the safety.

Another Reluctance Motor that can be used with similar advantages is a Synchronous Reluctance Motor (SyRM).

Further, use may be made of an Induction Motor, such as a Squirrel-Cage Induction Motor (SCIM) or a Wound-Rotor Induction Motor (WRIM)

Preferably, the position of the rotor in the motor is estimated by means of a certain algorithm based on a survey of the current to the motor. This estimated value may be compared in real time to a value measured by a rotational position sensor, for example a resolver. At a great difference between these two values the system can be deactivated. A type of redundancy is thus created.

A further safety may according to the invention be attained in that the maximum torque from the motor can simply be surveyed by surveying the DC current to the drive electronics for the motor. An SRM motor can namely not supply more torque than asked for at a given DC current.

BRIEF DESCRIPTION OF THE DRAWING

The invention will be described in further detail below under reference to the accompanying drawing, in which the single FIGURE is a section through an exemplary electric drive axle arrangement, in which the inventive ideas may be carried out.

DETAILED DESCRIPTION OF THE INVENTION

The invention relates to an electric drive axle arrangement for a road vehicle. Such a drive axle arrangement may typically be used as a rear axle for a hybrid car, whose front axle may be powered by an internal combustion engine.

The shown drive axle arrangement is only to be regarded as an example of an environment in which the invention may be utilized. The person skilled in the art has a certain knowledge about drive axle arrangements of the present type, and the description of the drive axle arrangement will accordingly be brief. For a more thorough description, reference may be made to WO 2010/101506.

The electric drive axle arrangement is provided with an electric drive motor 1 and an electric torque vectoring motor 2, which as shown may be coaxial with the drive motor. Two half-axles of the car, in which the electric drive axle arrangement is to be mounted, are to be connected at either side of the arrangement. Planetary gearings 3 and 4 are provided at the respective ends of a shaft 5 of the electric drive motor 1 and form a differential mechanism for the drive axle arrangement, so that the wheels may rotate at different velocities. The shaft 5 is connected to the sun gears of the planetary gearings 3 and 4, whose planet carriers are to be connected to the said half-axles of the car.

The purpose of the torque vectoring motor 2 is to provide a torque difference to the two half-axles and thus the drive wheels of the car. When the car is travelling on a straight course with the drive wheels rotating with the same speed, the torque vectoring motor 2 will stand still. When the car passes a surface with inhomogeneous friction, the torque vectoring motor 2 may be used to enhance the traction potential of the drive wheels. An activation of the torque vectoring motor 2 will result in an increased torque to one of the half-axles and a decreased torque to the other one.

The torque vectoring motor 2 is via a reduction gearing 6 connected directly to the outer ring of the planetary gearing 4 to the right in the FIGURE and via a balancing shaft 7 to the outer ring of the planetary gearing 3 to the left in the FIGURE, so that its torque is transmitted to planetary gearing outer rings in opposite directions.

The torque vectoring motor 2, the reduction gearing 6, and the balancing shaft 7 are comprised in the torque vectoring system of the arrangement.

One of the most important aspects of a torque vectoring system in the described environment is the safety. An especially important requirement is that the torque vectoring motor with its accompanying system shall not be able to supply a higher additional torque than called for by its control system and the circumstances. High demands are put on the design and redundancy of the system, which may lead to high costs.

It is state of the art to use a Permanent Magnet Synchronous Motor (PMSM) as the source of the torque in an electric torque vectoring system. A key factor in the control of a PMSM motor is to exactly know the position of the rotor in order to be able to supply adequate current in correct phase position and in such a way obtain the right torque from the motor. At high velocity the PMSM motor requires a current in order to supply a zero torque. A resolver or the like is normally used for determining the position of the rotor.

In a torque vectoring system an erroneous position signal can directly cause the torque vectoring motor to supply a higher torque than asked for, which will be difficult to detect, as the magnitude of the current is the same.

A natural solution to the problem is to introduce redundancy by duplicating the position assessment. However, this gives a great cost increase, as the entire signal chain (resolver, contacts, cables, electronics for reading and processing the signal) has to be duplicated. The great amount of extra components also takes volume, which is a very sparse commodity in the relevant environment.

If for example the resolver signal for some reason disappears, it is often regarded that an active shortcut is the safest condition to revert to. However, a further safety problem with the use of a PMSM motor for torque vectoring is that it supplies a torque also at shortcutting.

Further, the torque vectoring application puts the demand on the electric motor that it shall be able to work with a very high speed ratio. This can be defined as the ratio between the basic velocity and the mechanical maximum velocity of the electric motor. This ratio is here optimally say 1:20, which can cause problems for a permanent magnet motor, where the maximum ratio is say 1:5 without the generation of cumbersome high voltage at maximum velocity and dangerously high voltage at the loss of the active field weakening. The basic velocity therefore has to be increased 3-4 times more than necessary for the application itself, which results in that the current in the electric motor has to be increased correspondingly. The effect is an increase of complexity and cost.

Summarizing, a torque vectoring system with a conventional PMSM motor and a resolver provides a solution that even with only a singular fault may give rise to potentially dangerous situations for the car.

The problem with the great dependency on the rotor position signal can be decreased by the use of a non-permanent magnet motor as the torque vectoring motor in the described environment. Motors of type "switched reluctance" are especially well suited for use, as they can only supply a lower torque than requested at a defective position signal. A Switched Reluctance Motor (SRM) will not supply any torque at all at disruption of one or more phase conductors, a total dropout of the control electronics, or a shortcut, which is highly desirable from a safety perspective.

The changes in currents to the non-permanent magnet motor as torque vectoring motor are indicative of the position of its rotor. In order to further improve the safety of the system, these currents may be surveyed, so that the position of the rotor may be estimated by what can be called a "sensorless" algorithm. This estimated value can then in real time be compared with the measured value from a rotational position sensor, for example a resolver. If the difference between these two values is over a certain limit, the system can be deactivated. A type of redundancy is thus obtained by supplementing the resolver or the like with a software algorithm.

A further measure that will be made possible by the use of a non-permanent magnet motor is to survey the DC current to the drive electronics for improved safety. As a non-permanent magnet motor cannot supply more torque than demanded at a certain DC current, this measurement signal can be used to survey the maximum torque from the torque vectoring motor.

In contrast, the torque from a PMSM motor is also dependent of the phase position, and thus there is no direct correlation between DC current and motor torque.

Finally, a non-permanent magnet motor, especially an SRM, solves the problem with the high velocity ratio. As this motor does not have any magnets, whose fields actively need to be weakened over the basic velocity, the motor may be used in a velocity ratio in the order of 1:20 and thus be optimized for the application. The result is a more compact, cost effective and secure application, as the system cannot generate any dangerous voltage.

At the present stage of development, the SRM seems to be most advantageous in terms of cost, torque density, inverter complexity, controllability, speed range, power density and others, important for the present application. However, other non-permanent motors are feasible.

The invention claimed is:

1. An electric drive axle arrangement for a road vehicle, comprising an electric drive motor, a differential mechanism for allowing different velocities of two drive wheels driven by the drive motor, and a torque vectoring system for controlling a distribution of drive torque between the two drive wheels, the torque vectoring system comprising a torque vectoring motor, characterized in that the torque vectoring motor is a non-permanent magnet motor constructed and arranged to stop providing torque upon at least one of: a disruption at a phase conductor, a dropout of control electronics, or a short.

2. An arrangement according to claim 1, wherein the torque vectoring motor is a Reluctance Motor.

3. An arrangement according to claim 2, wherein the torque vectoring motor is a Switched Reluctance Motor.

4. An arrangement according to claim 2, wherein the torque vectoring motor is a Synchronous Reluctance Motor (SyRM).

5. An arrangement according to claim 1, wherein the torque vectoring motor is an Induction Motor.

6. An arrangement according to claim 5, wherein the Induction Motor is a Squirrel-Cage Induction Motor (SCIM).

7. An arrangement according to claim 5, wherein the Induction Motor is a Wound-Rotor Induction Motor (WRIM).

8. An arrangement according to claim 1, wherein an estimated value indicative of a position of a rotor of the torque vectoring motor is obtained by surveying changes in current supplied to the torque vectoring motor.

9. An arrangement according to claim 8, wherein the estimated value is compared to a value measured by a rotational position sensor.

10. An arrangement according to claim 9, wherein the rotational position sensor is a resolver.

11. An arrangement according to claim 1, wherein the drive torque from the motor is surveyed by surveying current to drive electronics for the torque vectoring motor.

12. An electric drive axle arrangement for a road vehicle, comprising an electric drive motor, first and second axle outputs driven by the electric drive motor, a differential mechanism effecting a distribution of drive torque between the first and second axle outputs, and a torque vectoring system controlling the distribution of drive torque between the first and second axle outputs, the torque vectoring system comprising a torque vectoring motor that is a non-permanent magnet motor, the torque vectoring motor connected with each of the first and second axle outputs; and wherein the torque vectoring motor is constructed and arranged to stop providing torque upon at least one of: a disruption at a phase conductor, a dropout of control electronics, or a short.

13. An arrangement according to claim 12 wherein the electric drive motor and the torque vectoring motor are disposed coaxial with one another.

14. An arrangement according to claim 12 wherein the electric drive motor has a rotor shaft with first and second ends, with a first planetary gearing disposed at the first end and a second planetary gearing disposed at the second end, the first and second planetary gearings having respective first and second sun gears, first and second planet carriers, and first and second outer rings, wherein the rotor shaft is directly connected to the first and second sun gears.

15. An arrangement according to claim 14 wherein the first planetary carrier is directly connected with the first axle output and the second planetary carrier is directly connected with the second axle output.

16. An arrangement according to claim 14 comprising a reduction gearing engaged with the torque vectoring motor, and a balancing shaft, wherein the torque vectoring motor is connected directly to the first outer ring via the reduction gearing, and the torque vectoring motor is connected directly to the second outer ring via the balancing shaft.

17. An arrangement according to claim 12 wherein the torque vectoring motor has a rotor that operates at a motor torque that is estimated by surveying current supplied to drive electronics for the torque vectoring motor.

18. A method of operating an electric drive axle arrangement for a road vehicle, that has an electric drive motor, first and second axle outputs driven by the drive motor, a differential mechanism effecting a distribution of drive torque between the first and second axle outputs, and a torque vectoring system controlling the distribution of the drive torque, the torque vectoring system comprising a torque vectoring motor that is a non-permanent magnet motor, the torque vectoring motor connected with each of the first and second axle outputs, comprising automatically providing no torque from the torque vectoring motor upon one or more of: a disruption at a phase conductor, a dropout of control electronics, or a short.

19. The method according to claim 18 comprising determining a position of the torque vectoring motor by surveying current supplied to the torque vectoring motor.

20. The method according to claim 18 comprising estimating an estimated position of the torque vectoring motor by surveying current to the torque vectoring motor, measuring a measured position of the torque vectoring motor using a position sensor, comparing the estimated position to the measured position, and deactivating the torque vectoring motor when the estimated position differs from the measured position by an amount greater than a threshold.

* * * * *